UNITED STATES PATENT OFFICE.

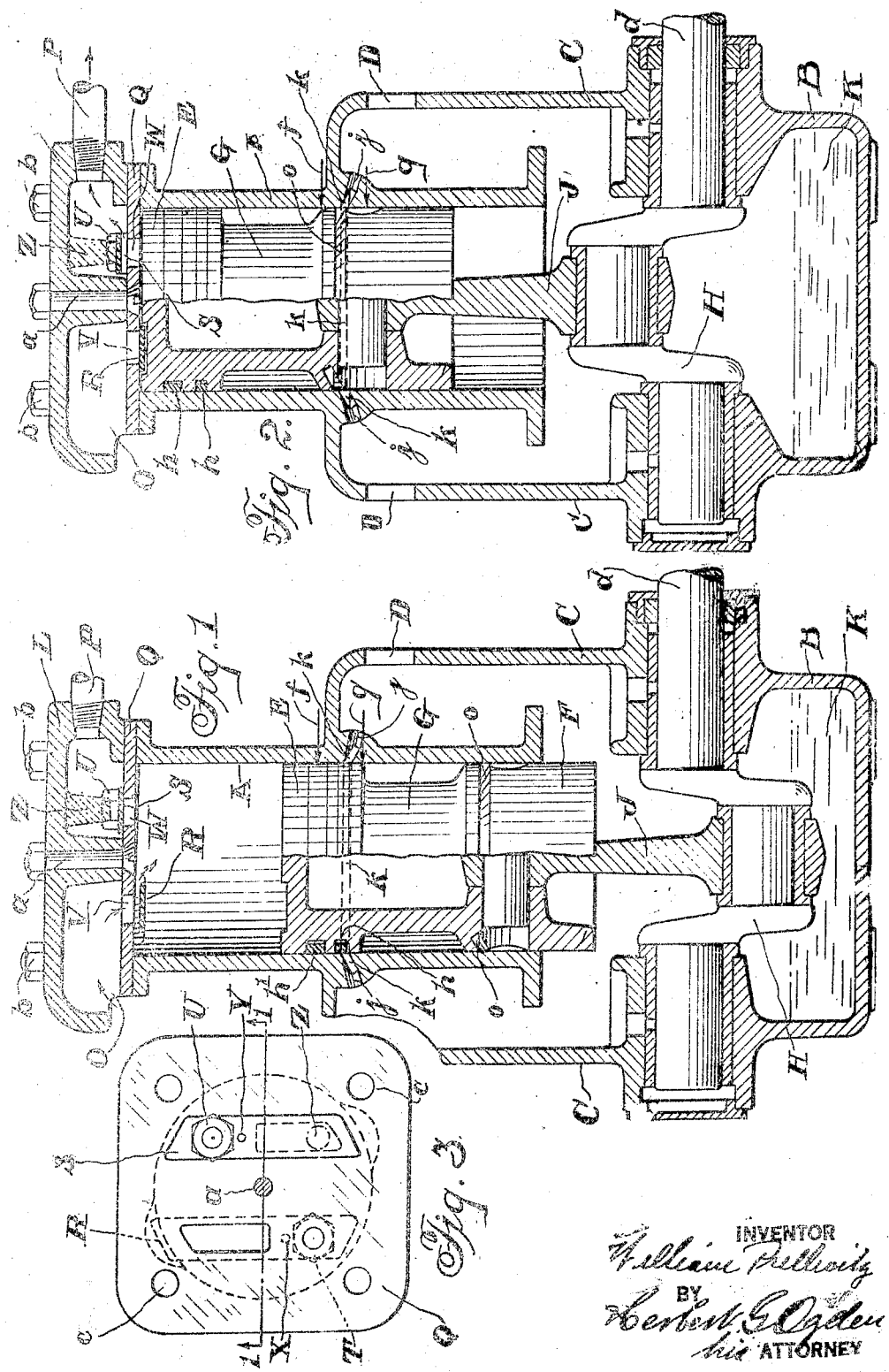

WILLIAM PRELLWITZ, OF EASTON, PENNSYLVANIA, ASSIGNOR TO INGERSOLL-RAND COMPANY, OF JERSEY CITY, NEW JERSEY, A CORPORATION OF NEW JERSEY.

COMPRESSOR.

1,408,638.

Specification of Letters Patent.   Patented Mar. 7, 1922.

Application filed June 3, 1920.   Serial No. 386,278.

*To all whom it may concern:*

Be it known that I, WILLIAM PRELLWITZ, a citizen of the United States, residing at Easton, in the county of Northampton and State of Pennsylvania, have invented a certain new and useful Improvement in Compressors, of which the following is a specification.

This invention relates to compressors for compressing air or gas and obtaining fluid under pressure free from oil, but more particularly to a compressor usually of small size which may be mounted on a motor vehicle and used for inflating the tires, as for instance, the heavy pneumatic tires of motor trucks which require considerable pressure. The compressor may, however, be built in any desired size and may be used for any other purpose for which it is found applicable or in any connection in which it is desired to obtain compressed air or gas free from oil, as in the manufacture of dried or desiccated milk, in which compressed air is commonly used to spray the milk into the desiccators.

The primary object of the invention is to enable the piston and cylinder and operative parts to be supplied with oil by splash lubrication from the crank case, while at the same time preventing an excessive amount of oil from accumulating on the piston and on the walls of the cylinder. In pumping up the pneumatic tires of a motor vehicle, especially a motor truck, compressed air free from oil should be obtained, as the oil injures the tire, and in accordance with my invention I am enabled to secure the desired comparatively high pressure without admixture of oil with the air.

Another object of the invention is to provide air valves which have no rubbing surfaces and hence can operate without the use of oil or any means of lubrication so that a further source from which oil may mix with the air is eliminated.

Further objects of the invention will hereinafter appear, and to all of these ends the invention consists of the arrangement of parts and combinations of elements substantially as hereinafter fully described and claimed in this specification and shown in the accompanying drawings in which, Figure 1 is a vertical longitudinal sectional view of a compressor with the piston partly broken away.

Figure 2 is a view similar to Figure 1 with the piston in a different position, and Figure 3 is a top plan view of the compressor with the head removed.

Referring to the drawings, the cylinder A and crank case B may be formed in any suitable manner, and in this instance the upper portion C of the crank case forms the usual "breathing" space for the crank communicating with the atmosphere at the openings D.

A piston reciprocates in the cylinder A and is preferably provided with the outer head E and the inner head F connected by the reduced neck G. The piston is connected to the crank H by the piston rod J and the piston and cylinder are supplied with oil from the crank case B, the oil being indicated at K.

The cylinder is provided with a suitable head L having the inlet opening O and the outlet P. Between the head L and the cylinder A is preferably placed a plate Q carrying the inlet valve R and the discharge valve S. These valves are preferably in the form of strips of sheet metal, secured to the plate Q by means of the screws and nuts T and U. The valves are adapted to seat over the inlet port V and the discharge port W respectively in the plate Q and require no lubrication. Dowel pins X and Y are preferably provided for centering and guiding the valve plates R and S and a stop Z preferably formed on the head L limits the lift of the discharge valve S. The head L and plate Q may be secured together as by means of the bolt $a$, and the head and plate are secured to the cylinder by means of the bolts $b$ passing through suitable bolt holes in the head L and also through the bolt holes $c$ in the plate Q.

As the piston reciprocates in the cylinder A, air is compressed in the usual manner and discharged at the outlet P, which may be suitably connected for inflating a tire.

The crank shaft $d$ may be connected to be driven in any suitable manner, as by means of the motor vehicle engine.

In order to prevent oil from mixing with the compressed air, I have provided means in connection with the piston and cylinder for preventing an excessive amount of oil from accumulating on the piston and on the walls of the cylinder. One of the important features of the invention consists in the construction and operation of the piston having the two heads E and F and the connecting neck G. The oil splashed on the piston and cylinder from the crank case, will be carried up in the cylinder by the inner head F approximately to the point indicated by the arrow $f$ and the arrangement is such that the inner end of the outer head E overlaps the travel of the inner head F by approximately the distance measured between the arrow $f$ and the arrow $g$. It is evident that the only oil which will reach the outer end of the cylinder is that picked up by the inner end of the outer head E as it overlaps the travel of the inner head F by the distance measured between the arrows $f$ and $g$, and by means of this construction the outer head E having the piston rings $h$ and $h'$ is sufficiently oiled, without permitting an excess of oil to enter the outer end of the cylinder.

In order to still further prevent oil from mixing with the compressed air, I provide drainage apertures $j$ of which there may be any desired number in the cylinder walls as shown, for permitting excess oil to drain away from the cylinder preferably back to the crank case. In order to facilitate the oil drainage and collect the excess oil, I preferably provide a circular groove $k$ inside the cylinder A communicating with the drainage apertures $j$ and this circular groove preferably extends inwardly at an angle to drain oil away from the bore of the cylinder. This groove $k$ is located inside the cylinder at a point intermediate the upper and lower overlap limits of the outer and inner piston heads E and F. To further aid in preventing oil from mixing with the air being compressed, I provide another cooperating groove $o$ in the periphery of the inner piston head F extending downwardly at an angle so that the oil will run out of the groove. The function of the groove $o$ is to collect the excess of oil and carry it into the collecting groove $k$ and permit the oil to drain out of the apertures $j$. With the piston in the position shown in Figure 1 on the inward stroke, the piston ring $h$ is approximately opposite the groove $k$ and aids in scraping and carrying the oil on the cylinder wall into the groove. With the piston in the position shown in Figure 2 on the outward stroke, the groove $o$ in the inner head of the piston lies approximately over the groove $k$ in the cylinder and permits oil which has been collected in the groove $o$ to run out into the groove $k$ and pass out of the apertures $j$.

I have found that my construction operates satisfactorily and efficiently and enables the use of splash lubrication so that the main bearings, crank pin, piston pin and the inner end of the piston receive proper lubrication and the outer end of the piston receives sufficient lubrication without allowing any oil to mix with the air being compressed. In view of having provided ample lubrication of the running gear, but allowing no oil to get into the air, I have applied air valves which operate without the use of oil or any means of lubrication, as these valves have no rubbing surface to lubricate. As no oil can get into the cylinder, there will be no chance of forming carbon deposits to make the valves leaky. My construction thus enables the compressor to be driven at high speed and produce sufficiently high pressure to inflate heavy motor truck tires without permitting oil to enter the tire which is destructive of the tire.

I claim:

1. A compressor having a cylinder and crank case, a crank operating in said crank case, a piston reciprocating in the cylinder and connected to the crank, said piston being formed with inner and outer heads connected by a reduced neck, the travel of the outer head in the cylinder partially overlapping the travel of the inner head, means for supplying oil to the inner head of the piston and operative parts and to the cylinder, a circular groove inside the cylinder communicating with drainage apertures in the walls of the cylinder, and a cooperating groove in the periphery of the inner piston head, said two grooves and drainage apertures serving to collect and drain away excess of oil in the cylinder.

2. A compressor having a cylinder and crank case, a crank operating in said crank case, a piston reciprocating in the cylinder and connected to the crank, said piston being formed with inner and outer heads connected by a reduced neck, the travel of the outer head in the cylinder partially overlapping the travel of the inner head, means for supplying oil to the inner head of the piston and operative parts and to the cylinder, and a circular groove extending inwardly inside the cylinder at an angle to the axis and communicating with drainage apertures in the walls of the cylinder for collecting and draining away excess oil.

3. A compressor having a cylinder and crank case, a crank operating in said crank case, a piston reciprocating in the cylinder and connected to the crank, said piston being formed with inner and outer heads connected by a reduced neck, the travel of the outer head in the cylinder partially overlapping the travel of the inner head, means for supplying oil to the inner head of the piston and operative parts, and to the cylinder, and a circular groove extending inwardly inside the cylinder at an angle to the axis and communicating with drainage apertures in the walls of the cylinder and a cooperating groove extending outwardly in the periphery of the inner piston head at an angle to the axis, said two grooves and drainage apertures serving to collect and drain away excess of oil in the cylinder.

In testimony whereof I have signed this specification.

WILLIAM PRELLWITZ.